US 6,460,610 B2

(12) United States Patent
Lambert et al.

(10) Patent No.: US 6,460,610 B2
(45) Date of Patent: Oct. 8, 2002

(54) WELDED HEAT EXCHANGER WITH GROMMET CONSTRUCTION

(75) Inventors: Marco Lambert, Vernon; Joseph S JuGer, Cheshire, both of CT (US)

(73) Assignee: Transpro, Inc., New Haven, CT (US)

( * ) Notice: Subject to any disclaimer, the term of this patent is extended or adjusted under 35 U.S.C. 154(b) by 0 days.

(21) Appl. No.: 09/845,582

(22) Filed: Apr. 30, 2001

(65) Prior Publication Data

US 2001/0023536 A1 Sep. 27, 2001

Related U.S. Application Data

(62) Division of application No. 09/266,206, filed on Mar. 10, 1999.

(51) Int. Cl.[7] .................. F28F 7/00; F28F 9/02
(52) U.S. Cl. ............ 165/82; 165/173; 165/175
(58) Field of Search .................. 165/173, 174, 165/175, 906, 149, 178, 82

(56) References Cited

U.S. PATENT DOCUMENTS

| 4,125,280 A | * | 11/1978 | Kuzel | 165/175 |
| 4,159,035 A | * | 6/1979 | Chartet | 165/173 |
| 4,369,837 A | * | 1/1983 | Moranne | 165/175 |
| 5,226,235 A | * | 7/1993 | Lesage | 165/149 |
| 5,490,560 A | * | 2/1996 | Helms et al. | 165/173 |
| 5,511,613 A | * | 4/1996 | Mohn et al. | 165/906 |
| 5,538,079 A | * | 7/1996 | Pawlick | 165/173 |
| 5,894,649 A | * | 4/1999 | Lambert et al. | 165/173 |

* cited by examiner

Primary Examiner—Henry Bennett
Assistant Examiner—Tho V Duong
(74) Attorney, Agent, or Firm—DeLio & Peterson LLC

(57) ABSTRACT

A heat exchanger comprising a core assembly having a plurality of tubes connected by an array of fins, with ends of the tubes extending from the fin array on at least one side of the core assembly and resilient, polymeric grommets disposed around, the tube ends. The heat exchanger includes a tank portion for receiving fluid entering or leaving the core assembly and a header portion having openings to receive the tube ends and grommets to create a sealed, fluid-tight tube-to-header joint. There is provided a reinforcing member across the opening of the tube ends extending from the tube end opening to the portion of the tube end around which the grommet is disposed without substantially extending into the fin array portion of the core assembly. The header portion comprises a substantially planar base having openings therein with side and end walls extending out of the plane of the base and connected by one or more fluid-tight welds to the tank portion. The side and end walls extend a distance sufficient to dissipate heat generated in making the welds and keep the heat generated from adversely affecting sealing ability of the grommets when the welds are made between the tank and header portion with the tube ends and grommets received in the header portion openings.

12 Claims, 6 Drawing Sheets

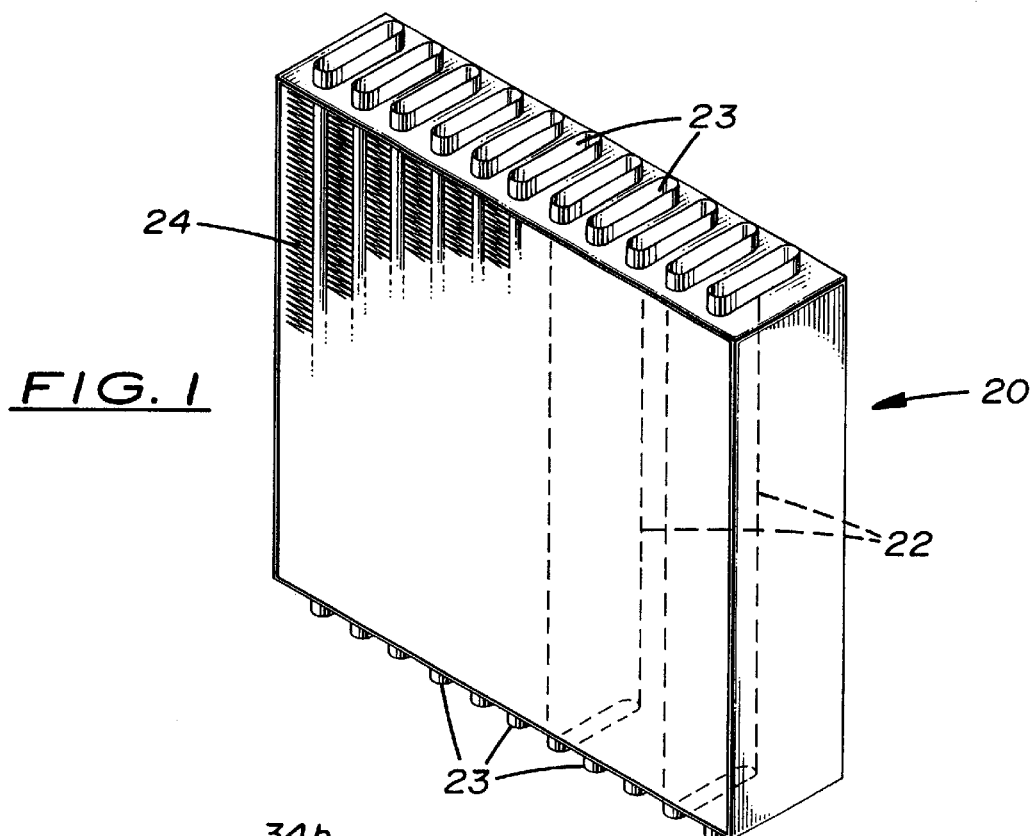
FIG. 1
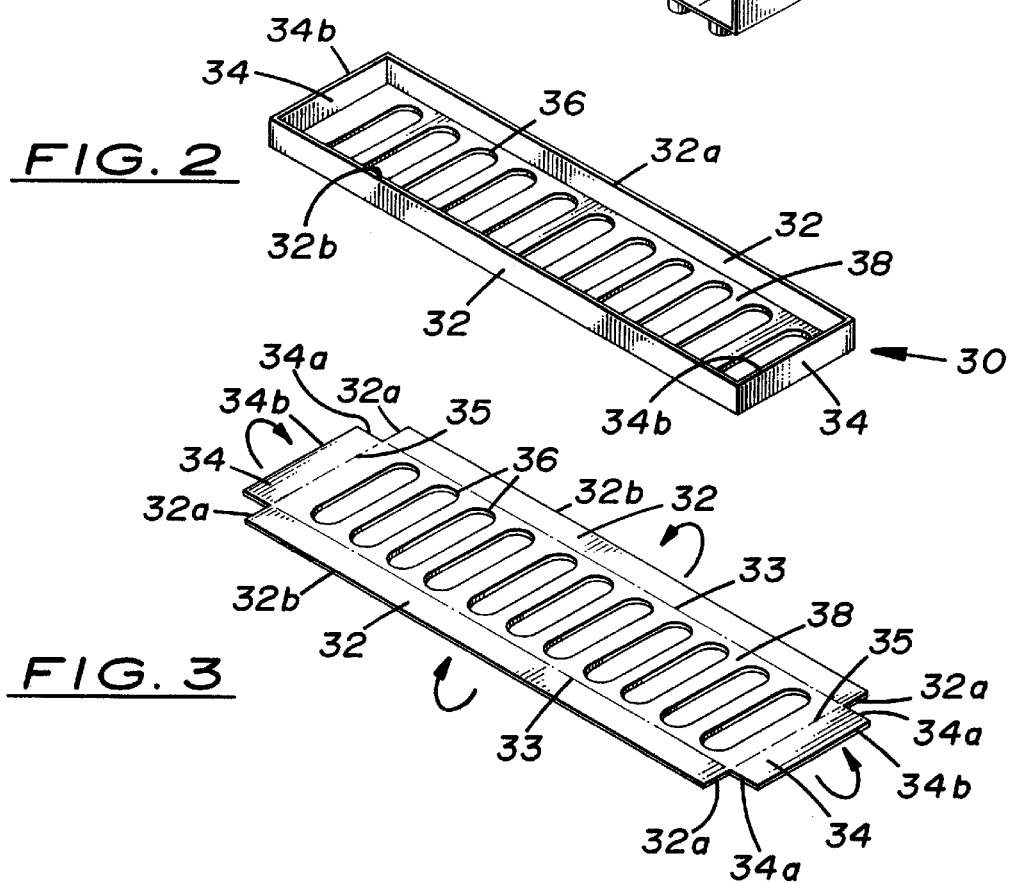
FIG. 2
FIG. 3

WELDED HEAT EXCHANGER WITH GROMMET CONSTRUCTION

This application is a division of U.S. application Ser. No. 09/266,206, filed 03/10/99.

BACKGROUND OF THE INVENTION

1. Field of the Invention

This invention relates to heat exchangers and, more particularly, to motor vehicle heat exchangers utilizing grommets in the tube-to-header joints and tanks welded to the header.

2. Description of Related Art

Heat exchangers, particularly those utilized in motor vehicles, may be liquid-to-air heat exchangers, (e.g., radiators for engine coolant, air conditioning condensers and evaporators, and oil coolers) or may be air-to-air heat exchangers (e.g. charge air coolers). Liquid-to-air and air-to-air heat exchangers are typically composed of an inlet tank or manifold, an outlet tank or manifold, and a large number of tubes extending between the tanks or manifolds which carry the fluid to be cooled. Headers are normally provided on the tubes for mechanical attachment and fluid connection to the tanks. Fins attached to the tubes transfer heat between the liquid or gas inside the tubes and the ambient atmosphere outside. A mechanical framework or structure is usually included to provide structural strength to the assembly and to provide means for mounting the unit to the vehicle or other machinery on which it is used.

The tubes utilized may be either round or oval, or may be oval with circular ends. Prior art methods of welding tube-to-header joints are disclosed, for example, in U.S. Pat. No. 5,407,004, the disclosure of which is hereby incorporated by reference.

In use, heat from the hot liquid or air within generally causes the tubes to expand and grow in length due to thermal expansion. Since the tanks or manifolds are fixed with respect to each other by the unit framework or structure, the growth in length of tubes places high mechanical stresses on the tanks and the associated headers, particularly in the area of the joints between the tubes and headers. In addition, the pressure of the hot liquid or hot air within the heat exchanger tends to distort the tanks or manifolds and headers, creating further stresses on the tube-to-header joints. The combination of stress resulting from thermal expansion and internal pressure can result in early failure of heat exchangers. Cracks in the joints between the tubes and the headers or in the tubes immediately adjacent to these joints are the most common mode of failure. Many approaches have been taken to avoid heat exchanger failures due to thermal expansion and internal pressure. Most approaches fall into one of two categories: 1) those which improve the strength of the areas prone to failure and 2) those which provide resilience in the areas prone to failure. Approaches which provide resilience have appealed to designers because, they provide a solution to the stresses of thermal expansion and internal pressures with a greater economy than any approach which must provide more material to, achieve an improvement in strength.

Engine cooling radiators for vehicles have sometimes been designed with resilient tube-to-header joints. Locomotive radiators have been manufactured by the assignee of the present invention for over thirty (30) years using headers of special resilient design. In this design, metallic headers have oversized holes or openings in them to receive oval brass tubes extending from the radiator core. Within the openings in the header there are placed oval brass ferrules. These ferrules are bonded to the header by molded silicone rubber. The ferrules are then soldered to the core tubes extending there through to form a leak-free, resilient joint between the tubes and the headers. Fins of the flat plate-type design have collars fitted around the tubes. The headers are mechanically attached to tanks, such as by bolting. While this has been an extremely effective design under typical operating conditions for locomotives, it is expensive to produce.

In the 1970's, radiators for automobiles were produced which utilized round aluminum tubes, aluminum plate fins, aluminum headers and plastic tanks. A sheet of molded rubber provided resilient grommets at each tube hole in the header, and also provided a gasket for sealing the headers to the plastic tanks, which were attached to the headers by means of crimped tabs on the headers. The insertion of the tubes into the rubber grommets in the header holes compressed the rubber of the grommets providing a resilient sealing attachment of the tubes to the headers. However, considerable force was required to insert all the core tubes into the header holes simultaneously. This design was limited to relatively small units because of the problems of core and header distortion during assembly and because of the close tolerances which were required to accomplish the mating of the core tubes to the header with the desired amount of grommet compression.

Other radiators have also utilized rubber grommets in their tube-to-header joints. These radiators have been designed around individual finned tubes having round ends and oval cross-sections which are finned along most of their length. As in the previous design, sealing of the tubes to the header was accomplished by compression of the grommets between the tubes and the header. However, in this alternative design, the tubes were assembled to the headers individually thereby avoiding high assembly forces. This allowed the construction of very large radiators for heavy construction equipment. However, it has been found that the use of tubes with round ends limits this design to cores having rather wide tube spacing, which results in relatively poor thermal performance compared to most radiator core designs.

U.S. Pat. Nos. 4,756,361 and 5,205,354 describe a radiator which utilizes circular tubes and tube ends which extend through silicone rubber grommets which are disposed in openings within a header plate. U.S. Pat. Nos. 5,052,475 and 5,226,235 disclose use of circular grommets to seal circular tubes into soldered tanks and welded tanks, respectively. British Patent No. 29,777 discloses the use of round tubes and grommets with a tube plate cast integrally with the header.

Currently, air-to-air heat exchangers using brazed aluminum cores having oval tubes are being produced commercially. Aluminum headers having oversized oval openings are welded to cast aluminum manifolds. Oval silicone rubber grommets, otherwise similar to those described in the aforementioned '361 patent, are inserted into the openings in the headers of the welded tanks.

In the aforementioned '361 patent, the headers are intended to be connected to inlet and outlet tanks by means of bolting with a sealing gasket, or other similar means. U.S. Pat. No. 5,226,235 describes a radiator made up of a unitary core consisting of tubes and fins, connected to tank assemblies which consist of welded tank and header assemblies into which resilient grommets have been inserted after welding. This '235 patent provides advantages over the '361 patent in that the welded tank and header assembly is more compact than one assembled by bolting with a sealing gasket. In addition, a welded tank design is quite flexible and can be quickly made up to suit any application. However, a difficulty with the '235 patent is that it requires that all welding of the tank/header assembly is to be completed before assembly of the resilient grommets to that assembly. Thins is stated to be necessary to prevent heat damage to the resilient grommets. However, it makes assembly of the unitary core assembly to the tank/header assemblies particularly difficult, since one can only see one side of the grommets and access to the other side of the grommets to aid in assembly is denied. For instance, it would aid insertion of the core tubes into the grommets if the tube ends were fitted with removable bullet noses. However, in the one-piece tank/header design, retrieval of the bullets after insertion is practically impossible.

Additionally, access to the side of the grommets remote from the tube insertion side can be helpful to tube insertion in other ways. For example, supporting or backing-up the remote side of the grommet during tube insertion makes tube insertion easier and prevents pushing out of the grommets. This is, of course, impossible with the one piece tank/header assembly described in the '235 patent.

It would be advantageous to have the critical tube-to-header joints made and inspected with full access to both the airside and fluid side of the joints. The core assembly can bet separately tested and corrections can be made to the tube-to-header joints, if necessary, before the tanks are attached.

Bearing in mind the problems and deficiencies of the prior art, it is therefore an object of the present invention to provide an improved heat exchanger and method of making such heat exchanger which utilizes grommets in tube-to-header joints, which header may be welded to the tank after insertion of the grommets.

It is a further object of the present invention to provide an improved method of assembly of a heat exchanger in which the core assembly can be separately tested and corrections can be made to the tube-to-header joints, if necessary, before the tanks are attached.

SUMMARY OF THE INVENTION

The above and other objects and advantages, which will be apparent to one of skill in the art, are achieved in the present invention which is directed to, in a first aspect, a heat exchanger comprising a core assembly having a plurality of tubes connected by an array of fins, with ends of the tubes extending from the fin array on at least one side of the core assembly, and resilient, polymeric grommets disposed around the tube ends. Preferably, the grommets of the heat exchanger are made of a heat-resistant silicone rubber.

The heat exchanger includes a tank portion for receiving fluid entering or leaving the core assembly and a header portion having openings receiving the tube ends and grommets to create a sealed, fluid-tight tube-to-header joint. The header portion comprises a base having openings therein and side walls extending out of a plane of the base and connected by one or more fluid-tight welds to the tank portion. The side walls extend a distance sufficient to dissipate heat generated in making the welds and keep the heat generated from adversely affecting the sealing ability of the grommets when the welds are made between the tank and the header portion with the tube ends and grommets received in the header portion openings.

The header portion of the heat exchanger may be comprised of a unitary sheet of metal having folded or drawn side walls extending from the base. The side and end walls of the header portion may be joined at corners thereof to create an open box structure. Preferably, the header base is substantially planar while the side and end walls are substantially perpendicular to the plane of the base.

In the preferred embodiment, the structure also includes a reinforcing member across the opening of the tube ends extending from the tube end opening to the portion of the tube end around which the grommet is disposed without substantially extending into the fin array portion of the core assembly.

In another aspect, the present invention relates to a heat exchanger comprising a core assembly having a plurality of tubes connected by an array of fins, with ends of the tubes extending from the fin array on at least one side of the, core assembly and resilient, polymeric grommets are disposed around the tube ends. The heath exchanger includes a tank portion for receiving fluid entering or leaving the core assembly and a header portion having openings to receive the tube ends and grommets to create a sealed, fluid-tight tube-to-header joint. The header portion comprises a substantially planar base having openings therein with side and end walls extending out of the plane of the base and connected by one or more fluid-tight welds to the tank portion. The side and end walls extend a distance sufficient to dissipate heat generated in making the welds and keep the heat generated from adversely affecting sealing ability of the grommets when the welds are made between the tank and header portion with the tube ends and grommets received in the header portion openings.

In yet another aspect, the present invention provides a method of making a heat exchanger. The method comprises initially providing a core assembly having a plurality of tubes connected by an array of fins with the ends of the tubes extending from the fin array on at least one side of the core assembly and resilient, polymeric grommets disposed around the tube ends. The grommets provided may be comprised of a heat-resistant silicone rubber. Also provided are a tank, having an open end portion for receiving fluid entering or leaving the core assembly, and a header portion with a base having openings for receiving the tube ends and side walls extending out of a plane of the base. In the preferred embodiment, the side walls are extended a distance sufficient to dissipate heat generated in welding the tank to the header portion and keep the heat from adversely affecting the sealing ability of the grommets when the welding is performed with the tube ends and grommets received in the header portion openings.

The method also includes attaching the header portion to the core assembly by receiving the tube ends and grommets in the header portion openings to create a sealed, fluid-tight tube-to-header joint. The header portion is then welded to the tank open end portion to create one or more fluid-tight welds. In the preferred embodiment, the welding takes place with the tube ends and grommets received in the header portion openings without adversely affecting the sealing ability of the grommets in the,tube-to-header joint.

The method may further include the step of either folding edge portions or drawing portions of the unitary sheet of metal comprising the header portion to create the side walls extending from the base, and may also include joining the side walls and end walls at corners thereof to create an open box structure. The side and end walls may be folded to positions substantially perpendicular to the plane of the substantially planar base.

In the preferred embodiment, the tube ends include a reinforcing member inserted across the opening of the tube extending from the tube end opening to the portion of the tube end around which the grommet is disposed without substantially extending into the fin array portion of the core assembly.

A further aspect of the invention relates to a heat exchanger comprising a core assembly having a plurality of tubes connected by an array of fins, with ends of the tubes extending from the fin array on at least one side of said core assembly and resilient, polymeric grommets disposed around the tube ends. A reinforcing member is disposed across the opening of at least a portion of the tube ends and extends from the tube end opening to the portion of the tube end around which the grommet is disposed without substantially extending into the fin array portion of the core assembly. The heat exchanger includes a tank for receiving fluid entering or leaving the core assembly and a header portion having openings receiving the tube ends and grommets to create a sealed, fluid-tight tube-to-header joint.

The header portion of this embodiment comprises a base having openings herein and side walls extending out of a plane of the base and connected by one or more fluid-tight welds to the tank. The side walls extend a distance sufficient to dissipate heat generated in making the welds, and keep the heat from adversely affecting sealing ability of the grommets when the welds are made between the tank and header portion with the tube ends and grommets received in the header portion openings.

BRIEF DESCRIPTION OF THE DRAWING

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a perspective view of the preferred unitary brazed core block employed in the present invention.

FIG. 2 is a perspective view of the preferred box header employed in the present invention.

FIG. 3 is a perspective view of the preferred stamped blank of the box header of FIG. 2.

DESCRIPTION OF THE PREFERRED EMBODIMENT(S)

Figure 4:
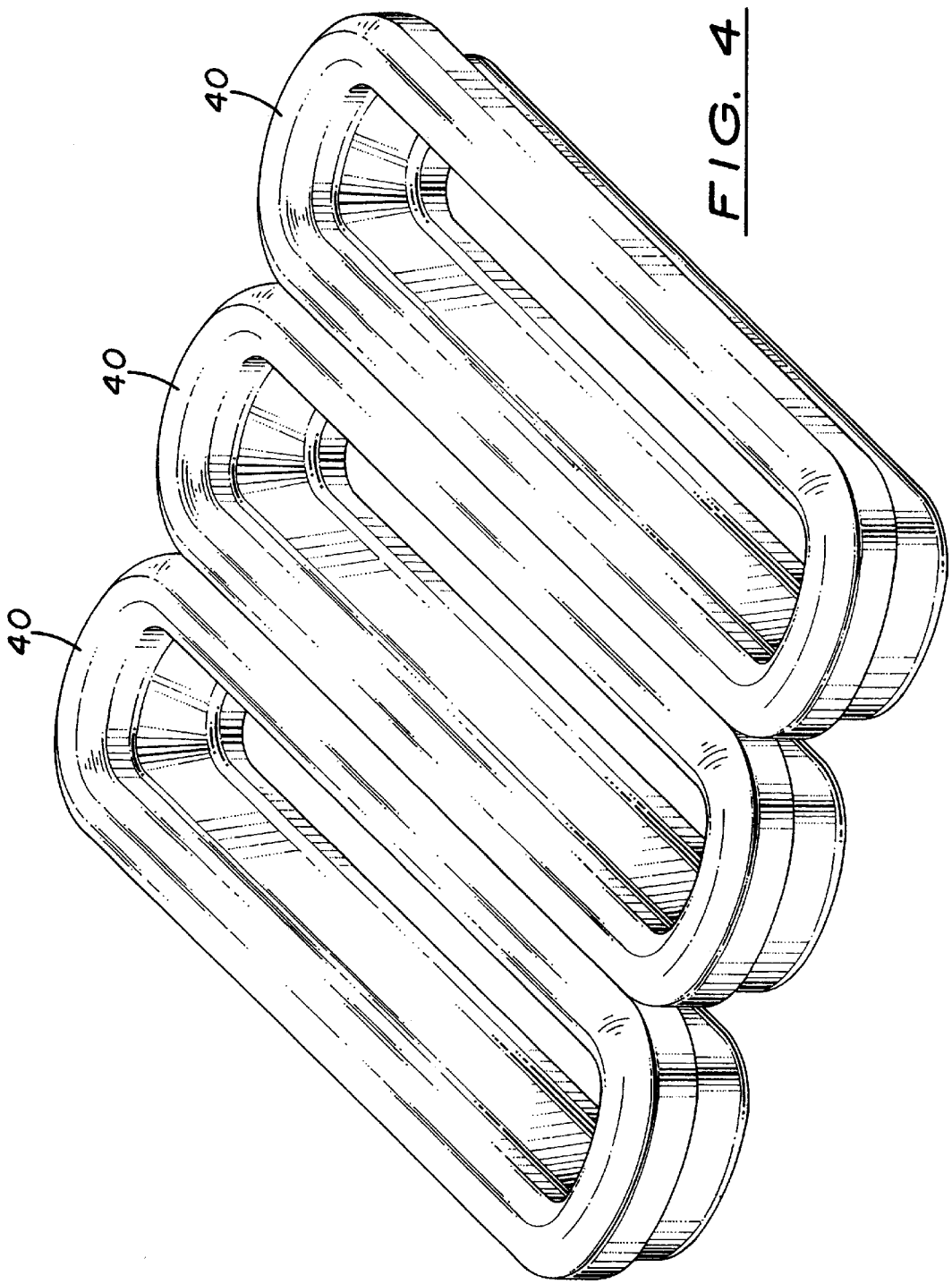
FIG. 4 is a perspective view of the preferred molded grommets employed in the present invention.

In describing the preferred embodiment of the present invention, reference will be made herein to FIGS. 1–13 of the drawings in which like numerals refer to like features of the invention. Features of the invention are not necessarily shown to scale in the drawings.

This invention is directed primarily to air cooled radiators which utilize a liquid coolant for automotive applications. However, it may also be utilized for any other type of heat exchanger, for example, those discussed in the background of the invention such as oil coolers, charge air coolers and the like. The present invention provides a structural assembly and method which permits the header to be welded to the tank after insertion of the grommets into the header openings, without heat damage to the grommet material. Preferably oval tubes are utilized in the heat exchanger for close tube spacing for optimum heat transfer performance of the core, although other tube shapes and cross-sections may be utilized.

As shown in FIG. 1, the heat exchanger of the present invention preferably utilizes a core block or assembly 20 which comprises an array of parallel tubes 22, preferably oval tubes, between which are interposed an array of heat transfer fins 24. These fins May be of the flat type or serpentine type as shown in the core depicted in FIG. 1. Any of these fin styles may include louvers to enhance heat transfer. The tubes and fins are typically formed of aluminum, brass, copper or other thermally conductive metal or alloy. Serpentine fins 24 may extend in a serpentine pattern wherein the strips are configured with a plurality of alternating bends between, adjacent tubes 22. The root of the bend is generally secured by brazing or soldering to the tube. Alternatively, the fins may be made of sheet metal which has a collar formed about a hole. The tubes may be inserted through the collar opening and a plurality of fins may be stacked in order to make up the fin array within the core. The ends 23 of tubes 22 extend beyond the fin array of core to connect to the headers and tanks utilized in the heat exchanger.

The preferred header employed in the present invention is depicted in FIG. 2. Header 30 comprises a generally rectangular body having a substantially flat or planar base portion 38 of length L and width W within which are formed header openings 36 which conform generally to the configuration of tube ends 23. The header portion openings 36 are preferably oval and arranged in a single row as shown, although multiple rows of tubes may be employed. As used herein, the term "oval" refers to any non-circular shaped axial cross-section (i.e. perpendicular to the axis of the tube) having a generally smoothly curving periphery such as an ellipse or a rectangle with rounded corners, or other obround or egg shape. Being of oval cross-sectional shape, such tubes and openings will have a diameter in one direction greater than the diameter in another (usually perpendicular) direction, which are referred to herein as the "major diameter" and "minor diameter" respectively. While oval shaped tubes and, consequently, oval shaped header openings and grommets are preferred, other tube opening and grommet configurations can be used, such as circular or rectangular. For reasons discussed further below, in order to accommodate the grommets, the header openings 36 are larger than the tube ends 23. The width W of header plate portion 38 is only slightly greater than the major diameter of header openings 36 to minimize header flexing and achieve maximum header portion strength.

Forming a box-type configuration to the header 30 are upstanding vertical side walls 32 and end walls 34 which extend upward from the plane of base 38. Side walls 32 face each other along opposite edges along the long sides of plate portion 38, corresponding to length L, while vertical upstanding end walls 34 face each other along the shorter ends of plate portion 38, corresponding to width W. Side walls 32 have free edges 32b at the upper portions thereof while end walls 34 have free edges 34b along the upper portions thereof. Edges 32b and 34b of header 30 are connected by welding to the tank portions of the heat exchanger as will be discussed further below. In order to permit proper heat dissipation and to prevent excessive heat buildup in the vicinity of header openings 36, it is preferred that the height H of side walls 32 and end walls 34b are carefully controlled. For an example of a header utilized in motor vehicles, it is preferred that the height of the side and end walls be at least about one-half (½) inch (1.25 mm), more preferably at least about one (1) inch (2.5 mm). The header side and end wall height is also preferred to be less than about two (2) inches (5.0 mm), more preferably less than about one and one-half (1½) inches (3.75 mm). The header side and end wall height should be high enough to avoid excessive temperatures to develop in the grommets as a result of welding at edges 32b, 34b to the tank, but not so high as to require excessive material. The header may be formed by any conventional manufacturing process, such as casting, stamping or drawing.

The preferred stamped blank of header 30 is depicted in FIG. 3. The header plate portion 38, side walls 32 and end walls 34 are preferably formed from a solid unitary sheet of metal, for example copper, brass or aluminum. Vertical side walls 32 are formed by bending or folding along the line indicated by 33 while vertical end walls 34 are formed by bending or folding along the lines indicated by 35. Side wall 32 end portions 32a then contact end wall 34 side portions 34a along a vertical seam which may be joined and sealed by welding to form corners. Such welding is preferably performed prior to insertion of the grommets since the corners formed by end portions 32a, 34a are relatively close to the header openings 36.

For drawn headers, the side walls 32 and end walls 34 (FIG. 2) are drawn from a unitary sheet of metal and extend upwards from the base or plate portion 38.

Grommets are the preferred sealing means between the tubes and the header portion openings. The preferred grommet of the preferred invention is depicted in FIG. 4. Grommet 40 is preferably made of a heat-resistant silicone rubber or other resilient, flexible or compliant polymer or other material which provides good sealing against the other components of the heat exchanger, and which has suitable heat resistance to avoid affecting the grommet's sealing ability when the header is welded to the tank while the grommets are in the header openings. The preferred grommet is made from silicone rubber, such as compound ST 125785-V-RED, which may be obtained from Dow Corning Corporation. The silicone rubber is a high-temperature silicone rubber which includes a vulcanizing agent and meets ASTM D2000. The other pertinent properties of the preferred grommet material were as shown in Table 1 below.

TABLE 1

| Property | Value |
| --- | --- |
| Hardness Shore A | 50 |
| Tensile Strength, kgf/cm² | 90 |
| Tear Strength, kgf/cm | 18 |
| Elongation, % | 300 |
| Specific Gravity | 1.16 |

TABLE 1-continued

| Property | Value |
| --- | --- |
| Shrinkage Rate, % | 3.3 |
| Compression Set, %, 22hr. @177° C. | 11 |
| Temperature Range, ° C. | minus 55 to plus 250 |
| Change After Heat Aging, 250° C./72hr.: | |
| Hardnesss, Points | 2 |
| Tensile, % | −19 |
| Elongation, % | −10 |

In laboratory tests with headers of the invention, it was determined that the grommets were able to withstand temperatures up to 500° F.–600° F. (260° C.–315° C.). Grommets 40 comprise a body portion having an opening therein to receive the tube from a heat exchanger core. A radially outward extending lip or flange is disposed at a first upper end of the body portion and a radially inwardly extending lip or flange is disposed at a second, lower end of the grommet. It should be understood that relative directional terms are used herein for reference only in connection with the drawings and the grommet and other components may be utilized in any position, including those other than that shown. Grommet 40 has a configuration which conforms to the shape of the oval openings 36 in header portion 38 which are sized to receive tube ends 23 from the header core (FIG. 1).

Figure 5:
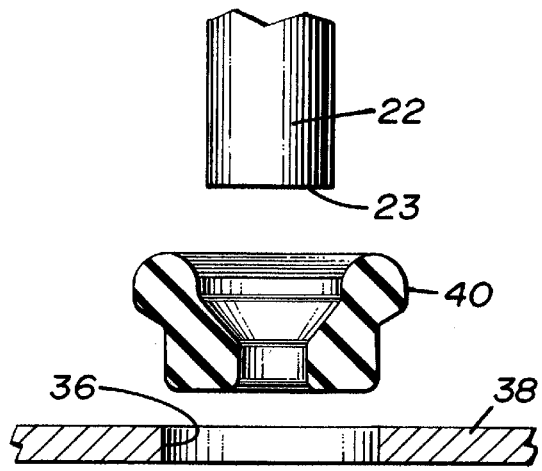
FIG. 5 is side elevational view of one step in assembling the tubes of the core assembly into the openings of the header plate to make the heat exchanger of the present invention.
Figure 6:
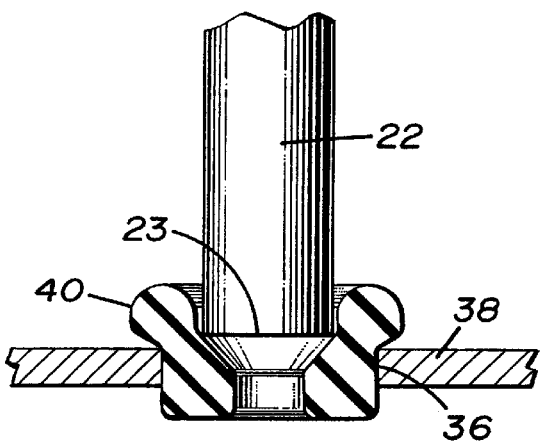
FIG. 6 is side elevational view of an assembly step subsequent to that of FIG. 5.
Figure 7:
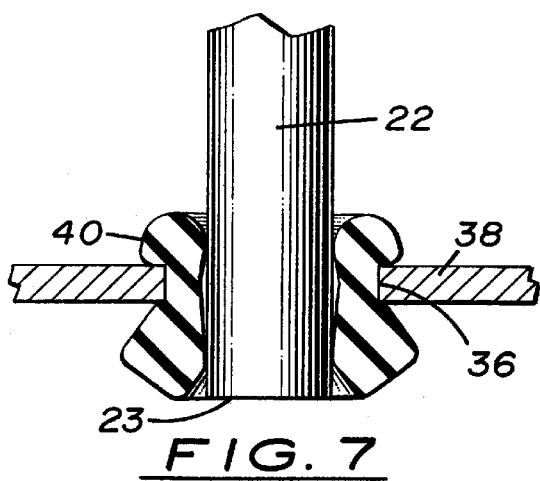
FIG. 7 is side elevational view of an assembly step subsequent to that of FIG. 6.

The assembly of the tube ends of the header core 20 into the header openings 36 utilizing the grommets is depicted in FIGS. 5, 6 and 7. In FIG. 5, both the tube 22 and grommet 40 are initially aligned along the direction of the length of the tube. As shown in FIG. 6, the grommet 40 is inserted into opening 36 of the header, and the tube end 23 is brought into contact with the grommet. Then, as shown in FIG. 7, tube end 23 is forced through the resilient inner opening of grommet 40 so that the tube 22 is fully received by the grommet within header opening 36. Referring back to FIG. 4, the grommets are preferably molded in groups of more than one, for example a group of three (3), so that they may be inserted three at a time into the header openings. Once all the grommets are inserted into the header openings, all of the tube ends 23 from the core assembly 20 are inserted at the same time through the grommet openings.

Preferably the inner diameter of the inward lip of the grommet is less than the outer diameter of the tube end, so that after full insertion of the tube, the outer wall, the lower end of grommet 40 is forced radially outward. Because of the resilience of the grommet material the tube stretches the grommet in the lower region and flexes its walls to provide good sealing contact between the inward lip and the outside surface of the tube end 23 to form a tight seal around the tube. Additionally, the expansion of the inward lip bulges or forces outward grommet outer wall portion which locks against and forms a seal with the edge of the header portion opening to prevent the grommet from slipping back out of the header portion opening. Sealing of the grommet to the tube and the header portion is further enhanced[ b]y the action of internal pressure inside the tank/header assembly 60 which serves to force the lip radially inward into tighter contact with both the tube and header portion in the manner of an o-ring seal. The inside surface of the upper end of the grommet may also be forced inward to contact the tube outer surface to seal against leakage. Additionally, the lower outside edge of outward lip may also seal against the edge of the header portion opening to provide an additional seal.

Figure 8:
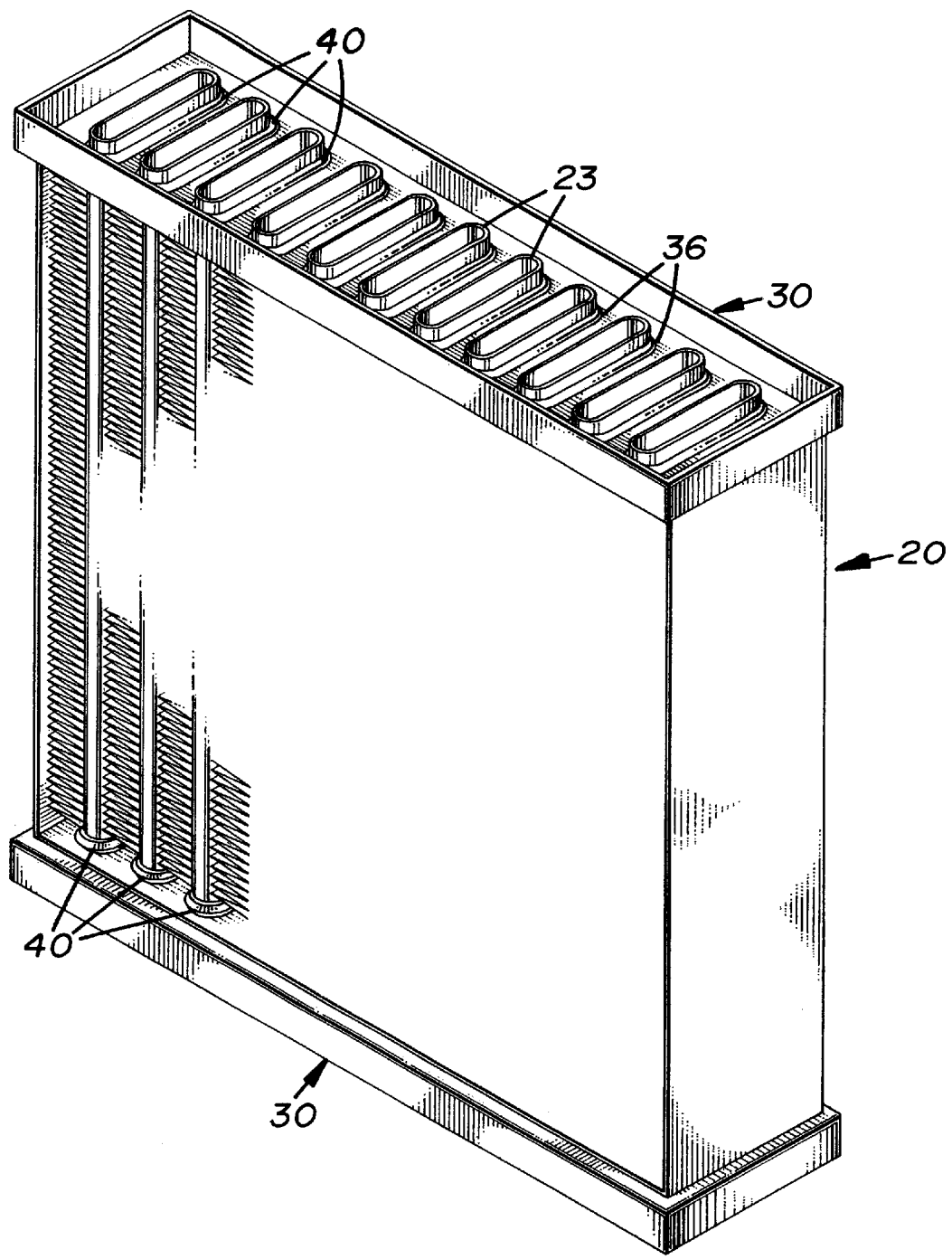
FIG. 8 is a perspective view of the box header of FIG. 2 assembled onto the unitary brazed core block of FIG. 1.

In FIG. 8 there is shown the preferred box header 30 attached and assembled to the core block 20 by means of grommets 40 which hold the tube ends 23 within the header openings 36 to create a sealed, tube-to-header joint. A header is shown both at the upper and lower portions of the core block attached to both the upper and lower tube ends.

Figure 9:
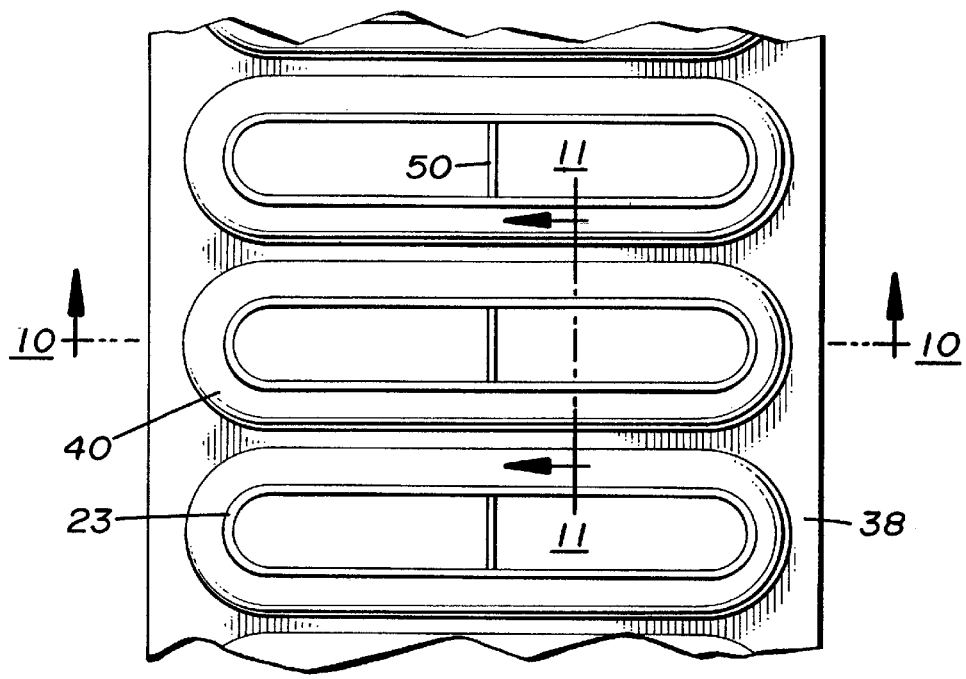
FIG. 9 is a top plan view of the tubes fitted into the box header of FIG. 8.
Figure 10:
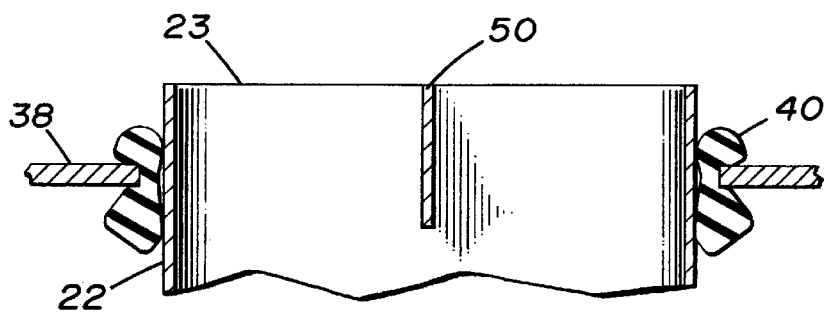
FIG. 10 is an end elevational view of a tube fitted into the box header along line 10—10 of FIG. 9.
Figure 11:
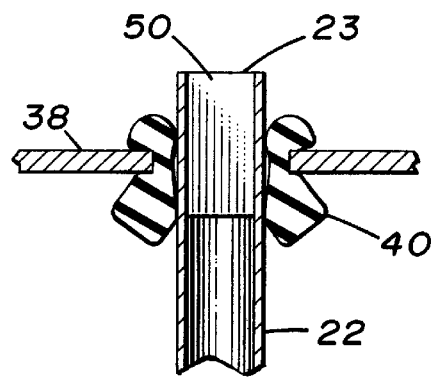
FIG. 11 is a side elevational view of a tube fitted into the box header along line 11—11 of FIG. 9.

In order to provide against collapse of the oval tubes during insertion into the grommets in the header openings, an internal reinforcing member or stiffener may be utilized across the opening of one or more of the tube ends as depicted in FIGS. 9, 10 and, 11. Tube stiffener 50 comprises a short flat length of metal or alloy comparable to the tube material which may be brazed or welded in place. Unlike internal fins which may be utilized in some oval tubes, tube stiffener 50 extends only from approximately tube end 23 to the portion of the tube surrounded by the grommet, and does not extend substantially further into the body of tube 22 within the fin array of the core assembly. Although one stiffener 50 is depicted in approximately the central portion of the tube opening, additional stiffeners may be employed along the opening of tube end 23. Such stiffeners 50 are particularly useful for tubes having a minor diameter of 0.5 inch (1.3 cm) to 1 inch (2.5 cm) or more. In such cases the internal stiffeners would extend in about 1 inch (2.5 cm) in from each end of each tube to provide internal support against collapsing under the compressive sealing forces of the grommet. By limiting the extent of stiffeners to only the end areas of the tubes, internal flow restriction of the tubes is minimized.

Figure 12:
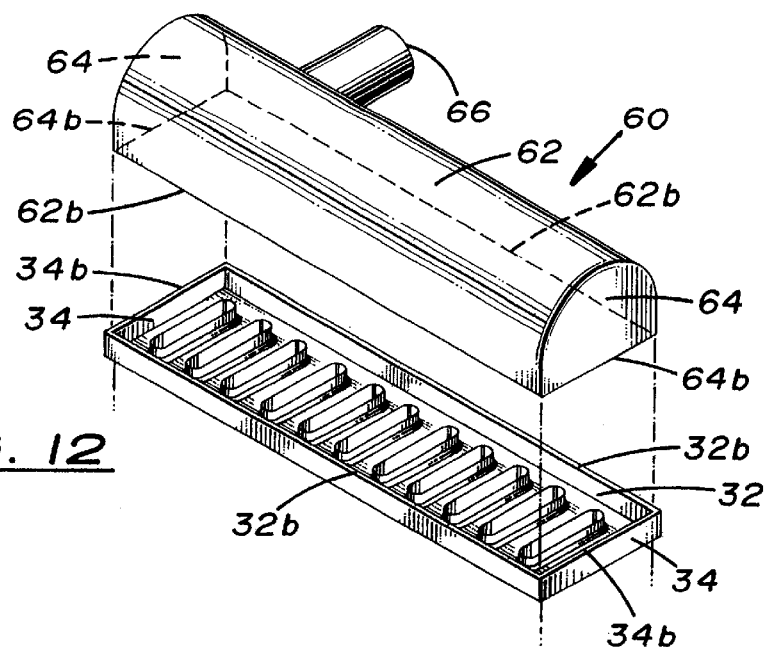
FIG. 12 is an exploded view of a preferred tank to be welded onto the box header of FIG. 2.

Assembly of the tank to the header 30 receiving the tube end through the grommets is depicted in FIG. 12. A tank portion 60 having an open end formed by side walls 62 and end walls 64 is aligned with header 30. The lower edges 62b of the tank side walls and lower edges 64b of the tank end walls are aligned with header side wail edges 32b and header end wall edges 34b, respectively. After contacting the respective edges of the tank 60 and header 30, the seams formed thereby may be welded by MIG or TIG welding procedures, or other well-known welding methods, to form one or more sealed, fluid-tight seams or joints. Both MIG and TIG welding procedures are preferred because they minimize heat flow into the header 30.

Figure 13:
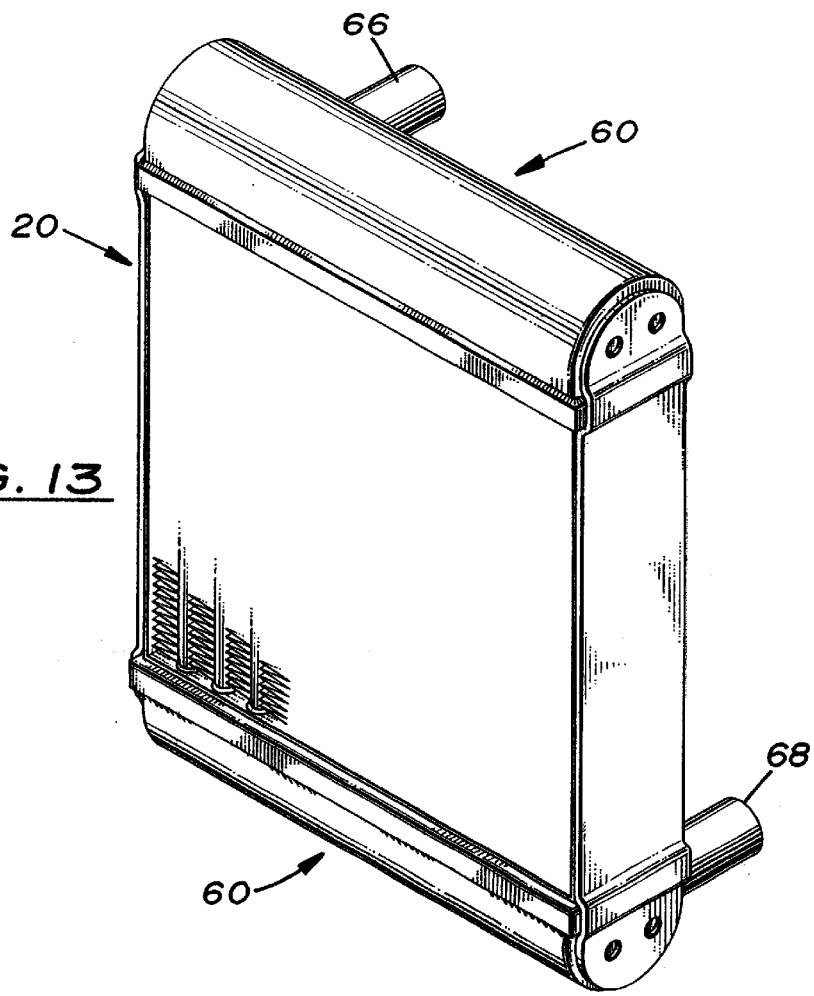
FIG. 13 is a perspective view of the tanks assembled onto the box headers and unitary brazed core block assembly of FIG. 8.

The completed heat exchanger is depicted in FIG. 13 in which a tank 60 is welded both to the upper and lower header portions. The upper tank 60 has inlet 66 for receiving the liquid coolant, which then travels through the tank and tubes in core section 20 to lower tank 60 and out through outlet 68. Preferably a structural side piece of welded or mechanically fastened bracing is fastened to the inlet and outlet tank and walls.

Thus, the heat exchanger and method depicted herein, utilizing resilient tube header joints, has greatly extended service life compared to common heat exchangers because of the reduction or elimination of tube to header stresses. The present invention facilitates assembly of the grommeted header to the core block because both sides of the grommet are accessible during assembly. This permits use of bullet noses on the tubes if necessary (to facilitate insertion of the tube ends through the grommets), backing up of the remote side of the grommet to resist tube forces from the tube insertion site and inspection of the finished tube to header joints from both sides of the header. The present invention also permits leak testing of the core assembly and adjustment of the tube to header joint before attachment of the tanks. The present invention preferably makes use of multiple grommets connected together to reduce the possibility of pushing out of the grommets during tube insertion. Additionally, the internal stiffeners prevent collapse of the tube ends due to grommet compression sealing forces. The present invention permits the use of drawn, cast or fabricated and welded tanks, all to be welded to the box headers. This provides manufacturing flexibility required to provide models, prototypes and short run production using fabricated and welded tanks, while using drawn or cast tanks for low cost, high volume production.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A combined core and header assembly for a heat exchanger comprising:
    a core assembly having a plurality of tubes connected by a fin array, said tubes having ends and openings in the ends, the tube ends extending from the fin array on at least one side of said core assembly;
    resilient, polymeric grommets disposed around the tube ends; and
    a header portion having openings receiving said tube ends and said grommets to create a sealed, fluid-tight tube-to-header joint, said header portion comprising a base having said openings therein and side walls on all sides of the base extending out of a plane of said base and connectable by one or more fluid-tight welds to a tank portion, said header portion being free of a tank such that the tube-to-header joint is accessible on both sides of said joint for inspection and testing before attachment to a tank portion, all of said side walls having free edges extending a distance out of the plane of said base sufficient to dissipate heat generated in welding said free edges to a tank portion from adversely affecting the sealing ability of said grommets when said welds are made between said tank portion and said header portion while said tube ends and grommets are received in the header portion openings.

2. The assembly of claim 1 wherein said header portion comprises a unitary sheet of metal having folded side walls extending from said base.

3. The assembly of claim 1 wherein said header portion comprises a unitary sheet of metal having folded side walls and end walls extending from said base, said side walls and end walls being joined at corners thereof to create an open box structure.

4. The assembly of claim 3 wherein the header portion base is substantially planar and said side and end walls are substantially perpendicular to a plane of said base.

5. The assembly of claim 1 wherein said header portion comprises a unitary sheet of metal having drawn side walls extending from said base.

6. The assembly of claim 5 wherein the header portion base is substantially planar and said side and end walls are substantially perpendicular to a plane of said base.

7. The assembly of claim 1 wherein said grommets comprise a heat resistant silicone rubber sufficient to avoid affecting the sealing ability of the grommet when the header portion is welded to the tank portion while the grommets are in the header portion openings.

8. The assembly of claim 1 wherein at least a portion of said tube ends includes a reinforcing member across the openings of said ends, said reinforcing member extending from the openings of the tube ends to the portion of said tube ends around which the grommet is disposed without substantially extending into the fin array portion of said core assembly.

9. A combined core and header assembly for a heat exchanger comprising:
- a core assembly having a plurality of tubes connected by a fin array, said tubes having ends and openings in the ends, with the tube ends extending from the fin array on at least one side of said core assembly;
- resilient, polymeric grommets disposed around the tube ends; and
- a header portion having openings receiving said tube ends and said grommets to create a sealed, fluid-tight tube-to-header joint, said header portion comprising a substantially planar base having said openings therein and side and end walls extending out of a plane of said base and connectable by one or more fluid-tight welds to a tank portion, said header portion being free of a tank such that the tube-to-header joint is accessible on both sides of said joint for inspection and testing before attachment to a tank portion, all of said side and end walls having free edges extending at least one-half inch out of the plane of said base to dissipate heat generated in welding said free edges to a tank portion from adversely affecting the sealing ability of said grommets when said welds are made between said tank and header portion while said tube ends and grommets are received in the header portion openings.

10. The assembly of claim 9 wherein said header portion comprises a unitary sheet of metal having drawn or folded side walls and end walls extending substantially perpendicular to the plane of said base, said side walls and end walls being joined at corners thereof to create an open box structure.

11. The assembly of claim 10 wherein said grommets comprise a heat resistant silicone rubber sufficient to avoid affecting sealing ability of the grommet when the header portion is welded to the tank portion while the grommets are in the header portion openings.

12. The assembly of claim 9 wherein at least a portion of said tube ends include a reinforcing member across openings of said ends, said reinforcing member extending from the openings of the tube ends to the portion of said tube ends around which the grommet is disposed without substantially extending into said fin array of said core assembly.

* * * * *

UNITED STATES PATENT AND TRADEMARK OFFICE
CERTIFICATE OF CORRECTION

PATENT NO. : 6,460,610 B2  Page 1 of 1
DATED : October 8, 2002
INVENTOR(S) : Lambert et al.

It is certified that error appears in the above-identified patent and that said Letters Patent is hereby corrected as shown below:

Column 3,
Line 7, delete "thins" and substitute therefore -- this --
Line 26, delete "bet" and substitute therefore -- be --

Column 5,
Line 20, delete "herein" and substitute therefore -- therein --

Column 6,
Line 39, after "core" insert -- 20 --

Column 8,
Line 56, after "enhanced" delete "[b ]y" and substitute therefore -- by --

Column 9,
Line 32, delete "wail" and substitute therefore -- wall --

Signed and Sealed this

Eighteenth Day of February, 2003

JAMES E. ROGAN
*Director of the United States Patent and Trademark Office*